United States Patent Office  
3,694,163  
Patented Sept. 26, 1972

3,694,163  
TEST SYSTEM FOR THE DETERMINATION OF SUBSTANCES IN TEST FLUIDS AND PROCESS FOR THE PREPARATION THEREOF  
Robert Thomas Sherelis, Elkhart, Ind., assignor to Miles Laboratories, Inc., Elkhart, Ind.  
No Drawing. Filed Apr. 13, 1970, Ser. No. 28,104  
Int. Cl. C12k 1/10; G01n 31/06, 33/16  
U.S. Cl. 23—253 TP                      10 Claims

ABSTRACT OF THE DISCLOSURE

A test system and device for the determination of substances in test fluids which utilizes a novel cellulose derivative membrane in conjunction with a test reagent specifically reactable with the substance being detected and sensing means for detecting electrical, chemical or physical changes in the membrane when the test reagent contacts the substance being detected. The membrane is prepared using a controlled organic phase evaporation: aqueous inversion process from a solvent solution of polymeric cellulose derivative and an interacting swelling agent, preferably formamide, said test reagent contained in said solution and the resulting membrane in either dissolved or dispersed form.

BACKGROUND OF THE INVENTION

The science of analytical chemistry has progressed over the past few years with dramatic rapidity. For example, classical analytical chemistry has provided the biochemist with test reagents which are highly specific while modern instrumentation allows a rapid and quantitative readout of the reaction between the compound being detected and the highly specific test reagent. The resulting combination of such specific test reagents and instrumentation has resulted in routine chemical analyses which are precise, sensitive and extremely rapid. Examples of highly specific test reagents are those involving the use of enzymes which react only with specific substrates therefor.

Recently it has been found that test reagents such as those utilizing enzymes or substrates therefor can be immobilized or fixed in or on a matrix means such that when the matrix means contacts the fluid or medium being tested, characteristic electrical chemical or physical changes occur. When these changes are measured using a sensing means, the values obtained can easily be converted into a quantitative measure of the concentration of a constituent in the fluid being tested.

Prior art matrix means for immobilizing or fixing test reagent systems usually comprise a preformed polymer solution or monomer system into which the test reagent is dissolved or dispersed, followed by either drying in the case of the preformed polymer solution or in situ polymerizing in respect to the monomer system. The result is a gel or membrane containing the test reagent in dissolved or dispersed form. Such systems are at best difficult to control and reproduce in the physical properties are entirely dependent upon drying time, type or polymer, membrane thickness, and so forth. Moreover, such prior art membrane systems are usually isotropic in nature which results in a system which is not ideally suited as matrix means for test reagent systems such as disclosed herein.

It is therefore an object of the present invention to provide a test device membrane structure which may be prepared to allow optimum diffusion and interaction between test fluid, test reagent and sensing means.

SUMMARY OF THE INVENTION

The present invention comprises a novel test device membrane structure and associated sensing means for determining substances in test fluids. This membrane is structurally polarized and is prepared by forming a fluid film of a solvent solution or dispersion of a preformed, polymeric cellulose derivative, a swelling agent and a predetermined amount of a test reagent specifically reactable with the substance being determined and subjecting this fluid film to a controlled or partial drying to convert the film to a solid or semi-solid structure followed, if desired, by an aqueous phase inversion. A second fluid film layer of cellulose derivative is then added to the membrane and the composite subjected to a second controlled drying and/or a final aqueous phase inversion. The result is what is called a structurally polarized or bag-like membrane structure and when associated with a sensing means, forms a highly effective test system.

DESCRIPTION OF THE PREFERRED EMBODIMENTS

The basic membrane ingredient of the present invention is a preformed polymeric cellulose derivative. Such substances are organic solvent-soluble, water-insoluble, often thermoplastic and may be generally classified as cellulose esters or ethers. The common cellulose esters which may be employed in the present invention are cellulose acetate, cellulose propionate, cellulose acetate propionate, cellulose butyrate and cellulose nitrate. The ethers which find use are ethyl cellulose, ethylhydroxy cellulose and cyanoethyl cellulose.

In cellulose technology, the composition of a derivative may be expressed in weight percent of a substituent or a portion of a substituent which has been analytically determined. For example, cellulose acetate compositions may be expressed in percent acetyl or percent combined acetic acid. For cellulose nitrate this value is expressed as percent nitrogen.

In preparing the membranes of the present invention, the cellulose derivative is dissolved in an appropriate organic solvent and an interacting swelling agent added thereto. This swelling agent may be any of the various lower fatty acid amides, such as formamide, acetamide, propionamide, dimethyl formamide and so forth. Advantageously, amides of about from one (1) to six (6) carbon atoms may be employed with formamide the preferable compound.

In this regard it has been found that the use of a swelling agent in the preparation of a membrane structure as disclosed herein and containing an entrapped or immobilized test reagent system results in a membrane product and resulting test system having controlled properties such as for example: pore size, density and skin thickness, which characteristics control transport properties as well as reaction product levels in the membrane; response time to steady state, sensitivity, stability, membrane life, and so forth.

The membrane structure of the present invention is used in conjunction with a sensing means which monitors and reports any reaction between the immobilized test reagent and the substance being determined to form a test system or device. As such, the sensing means may be any of various instruments, meters, and other test devices which are commonly used to detect physical, chemical, or electrical changes or other variations in fluids caused by a chemical reaction and may include means which detect reaction products, a decrease in concentration of one of the reactants present, or the reaction itself such as by a release or absorption of energy. Sensing means which may be used in the present test system include, conductivity meters, e.m.f. sensing devices, colorimeters, spectrophotometers, fluorimeters, pH meters, polarimeters, and so forth. An ideal situation exists when the sensing means is coupled physically to the membrane structure such as by using electrodes which may be coated with the membrane and attached electrically to the sensing means such as by electrical wires to a conductivity meter. In such a test system the electrodes plus the membrane structure form a probe which may simply be immersed into the fluid being tested in order to determine unknown constituents therein.

An advantageous embodiment of the present invention involves the use of a differential conductivity meter as described in copending U.S. Ser. No. 876,350 now Pat. No. 3,635,681, assigned to the assignee of the present application. In such a system, the background conductivity of the test fluid is automatically subtracted from the conductivity caused by the chemical reaction between the test reagent and the substance being detected to give a direct readout of the quantity of unknown in the test fluid, independent of variations in interfering ionic constituents in the test fluid.

As noted hereinbefore, the membranes of the present invention are directly associated with or coupled to the sensing means. In the situation where the sensing means is an electrode system such as a pair of spaced electrodes, such electrodes are simply coated with a fluid film of an organic solvent solution or dispersion of a mixture of the swelling agent, cellulose derivative and test reagent in either dissolved or dispersed form. The fluid film is then converted into a solid membrane structure such as by an aqueous phase inversion process as will be described hereinafter and/or a controlled drying procedure. The membrane is then recoated with a second layer of fluid film which may simply comprise the cellulose derivative in a solvent system or the initial mixture of cellulose derivative, swelling agent nad test reagent. This second layer of fluid film is then subjected to a controlled drying and/or an aqueous phase inversion to form a structurally polarized or bag-like membrane. This process may be repeated several or as many times as desired with or without aqueous phase inversion between membrane layer applications while the drying parameters and phase inversion may be varied to suit the individual requirements of the membrane and test reagent. In such a structurally polarized membrane system, the test reagent is contained in a loose or porous structure enclosed in a skin to form a bag-like membrane having the above noted characteristics.

The phase inversion process comprises immersing the membrane into an appropriate aqueous system and allowing the membrane to remain therein until the system is completely aqueous phase equilibrated. Obviously in such a phase inversion, some of the smaller water soluble molecules may be leached out of the membrane, along with the solvent or swelling agent or any part thereof not previously removed or intimately associated with test reagent or membrane. In this process, the sol or liquid phase is inverted into a gel or solid phase with the consequent formation of an anisotropic membrane structure which has been found to be extremely advantageous when such a structure includes a test reagent system. Neutral buffers such as tris or phosphate buffers have been found to be a particularly advantageous aqueous system for use in the phase inversion process.

As can be seen from the above, the membrane structure of the present invention can be varied over a wide range of chemical and physical parameters. For the purpose of making the present disclosure as complete as possible, the following proportions of ingredients may be used as a starting point when the polymer solution is prepared from cellulose acetate (39.5% acetyl content). The proportions of ingredients used may extend beyond this range but reasonable response behavior (activity) would require changes in membrane preparation parameters.

|  | Per 20 ml. of solvent (acetone) |
|---|---|
| Cellulose acetate | g 0.5–2.5 |
| Swelling agent | ml 0.5–2.0 |

As far as organic solvents for use in the present invention are concerned, any solvent may be used which (1) solubilizes or otherwise disperses the cellulose derivatives, (2) can be volatilized or otherwise removed such as in a phase inversion process, and (3) does not denature or otherwise inactivate the test reagent. Solvents such as acetone, ethyl acetate, benzene, toluene, ketones, mixtures of the above with lower alcohols, and so forth, may be utilized.

In regard to the test reagent, the membrane structure disclosed herein may be combined with any reagent system which is specifically reactable with the substance being determined and produces the necessary physical, chemical or electrical response which may be monitored by the sensing means. Exemplary of the many test reagents which may advantageously be used in the present invention are those which include enzymes as an active constituent. Such test reagents have been found to be highly specific, rapid and extremely sensitive to low concentrations of the corresponding substrates for the enzyme included in the test reagent. Enzyme-substrate systems such as glucose oxidase-glucose, urease-urea, uricase-uric acid, galactose oxidase-galactose, peroxidase-hydrogen peroxide, guanase-guanine, xanthine oxidase-xanthine, L-amino acid-L-amino acid oxidase, and the like may be used as test reagents in the practice of the present invention. Other test reagent systems may be utilized, including dyestuffs, enzyme substrates, complex organic molecules and so forth, as long as (1) the membrane permits the substance being detected to enter and (2) retains the test reagent reasonably well within the membrane matrix and in proper relation to the sensing means.

Example 1

An organic solvent solution of cellulose derivative and test reagent was prepared by adding 100 mg. of lyophilized crude urease (activity=50 units per mg.) (Worthington) to 20 ml. of acetone and sonicating the mixture for ten seconds. To this mixture was added 1.0 ml. of formamide and 3.0 ml. of cellulose acetate (39.5% acetyl content) and the composite thoroughly mixed. A conductivity electrode comprising a pair of platinum plates 4 mm. x 8 mm. spaced 4 mm. apart using a glass block (Radiometer Type P P 1042 BC conductivity electrode—London Company—Copenhagen, Denmark) was dipped into the cellulose acetate-urease solution and air dried for one (1) minute. The electrode was then redipped into the cellulose solution, air dried for (1) minute and again dipped into the cellulose solution. The last drying time was varied for several electrodes for 5, 7, 10 and 20 minutes respectively prior to immersing the electrodes in 0.1 M tris-sulfate, pH 7.4 buffer for at least 30 minutes. The electrodes which were air dried on the third dip for 5, 7, 10 and 20 minutes were identified as A, B, C and D respectively.

Solutions containing 15 and 30 mg. percent urea were tested by adding appropriate amounts of urea to 100 mls. of 0.1 M tris-sulfate buffer having a pH of 7.4 in a controlled temperature environment (24.70±.05). Electrodes A, B, C and D after attachment to a conductivity meter (Radiometer Type—London Company—Copenhagen, Denmark) were then immersed into 100 mls. of 0.1 M tris-sulfate buffer in order to obtain a background conductivity reading. The background buffer conductance was electrically substituted with a decade resistance box and the urea readouts obtained after addition of urea. The results were as follows:

| Electrode: | Background conductance in micromhos | Conductance in micromhos 15 mg., percent | Conductance in micromhos 30 mg., percent | Response time in minutes |
|---|---|---|---|---|
| A | 3,497 | 60 | 110 | 0.6 |
| B | 2,203 | 162 | 275 | 1.0 |
| C | 719 | 162 | 280 | 2.5 |
| D | 806 | 138 | 250 | 3.8 |

Example 2

An electrode was prepared as in Example 1 except that the organic solvent solution of cellulose derivative and test reagent had the following composition:

Acetone _____ml__ 20
Urease _____mg__ 200
Formamide _____ml__ 1
Cellulose acetate _____ml__ 2.4 and the air drying time between coatings was 2½ minutes and the final drying time before phase inversion was 12 minutes. When tested as in Example 1, the following results were obtained:

| Day of test: | Background conductance in micromhos | Conductance in micromhos 15 mg., percent | Conductance in micromhos 30 mg., percent | Response time in minutes |
|---|---|---|---|---|
| 1 | 2,387 | 112 | 182 | 1.0 |
| 2 | 2,326 | 103 | 175 | 1.0 |
| 6 | 2,336 | 92 | 160 | 1.0 |
| 13 | | 82 | 140 | 1.0 |

What is claimed is:

1. A process for the preparation of a test device membrane for determining substances in test fluids, said process comprising:
   (A) preparing in an organic solvent a first mixture of a polymeric cellulose derivative, a swelling agent and a predetermined amount of a test reagent specifically reactable with said substance being determined;
   (B) forming the mixture into a fluid film;
   (C) subjecting the fluid film to a controlled drying procedure to form a first membrane;
   (D) preparing a second mixture of a polymeric cellulose derivative with an organic solvent;
   (E) adding to said first membrane a fluid film of said second mixture; and
   (F) subjecting the composite of first membrane and second fluid film to an aqueous phase inversion by immersion in an aqueous fluid to form a structurally polarized second membrane having the test reagent immobilized therein.

2. A process as in claim 1 wherein the aqueous phase inversion (f) is preceded by a controlled drying.

3. A process as in claim 1 wherein the controlled drying (C) is followed by an aqueous phase inversion.

4. A process as in claim 1 wherein the second mixture is the mixture of Step A.

5. A process as in claim 1 wherein the test reagent is an enzyme and the substance being detected is a substrate therefor.

6. A process as in claim 1 wherein the cellulose derivative is an organosoluble cellulose ester or ether.

7. A process as in claim 1 wherein the swelling agent is a lower fatty acid amide of about from 1 to 6 carbon atoms.

8. A process as in claim 7 wherein the fatty acid amide is selected from the group consisting of formamide, dimethylformamide, acetamide and propionamide.

9. A process as in claim 5 wherein the cellulose derivative is cellulose acetate.

10. A product prepared by the process of claim 1.

References Cited

FOREIGN PATENTS 953,414   3/1964   Great Britain.

OTHER REFERENCES

Chemical Engineering, May 3, 1971, pp. 39 and 40.

MORRIS O. WOLK, Primary Examiner

R. M. REESE, Assistant Examiner

U.S. Cl. X.R.

195—103.5, 127; 210—490